(12) United States Patent
Sadek et al.

(10) Patent No.: US 9,717,091 B2
(45) Date of Patent: Jul. 25, 2017

(54) MOBILITY-BASED FRACTIONAL FREQUENCY REUSE

(71) Applicant: QUALCOMM Incorporated, San Diego, CA (US)

(72) Inventors: Ahmed Kamel Sadek, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 14/028,271

(22) Filed: Sep. 16, 2013

(65) Prior Publication Data

US 2015/0080003 A1 Mar. 19, 2015

(51) Int. Cl.
*H04W 72/00* (2009.01)
*H04W 72/04* (2009.01)
(Continued)

(52) U.S. Cl.
CPC ......... *H04W 72/048* (2013.01); *H04L 5/0037* (2013.01); *H04L 5/0058* (2013.01);
(Continued)

(58) Field of Classification Search
CPC ... H04W 16/02; H04W 72/082; H04W 16/10; H04W 16/12; H04W 72/0453;
(Continued)

(56) References Cited

U.S. PATENT DOCUMENTS 8,134,968 B2 * 3/2012 Tong .................. H04W 72/048
370/329
8,320,253 B2 11/2012 Saitou
(Continued)

FOREIGN PATENT DOCUMENTS

WO 2009099289 A2 8/2009
WO 2011071554 A1 6/2011

OTHER PUBLICATIONS

Chang J., et al., "Cooperative Interference Mitigation using Fractional Frequency Reuse and Intercell Spatial Demultiplexing", Journal of Communications and Networks, New York. NY, USA, IEEE, US, vol. 10, No. 2, Jun. 1, 2008 (Jun. 1, 2008), pp. 127-136, XP011483661, ISSN: 1229-2370, DOI: 10.1109/JCN.2008. 6389832.
(Continued)

*Primary Examiner* — Allahyar Kasraian
(74) *Attorney, Agent, or Firm* — Muncy, Geissler, Olds & Lowe, P.C.

(57) ABSTRACT

Fractional frequency reuse (FFR) is defined based on a mobility condition of an access terminal. For example, upon determining that an access terminal is moving (or at a cell edge, or experiencing poor link conditions, etc., due to mobility), FFR may be defined for the serving access point of the access terminal and/or for neighbor access points to maintain acceptable link quality for the access terminal. In particular, FFR may be defined in a manner that frees-up or otherwise reserves resources for the access terminal. For example, the serving access point may allocate additional sub-bands for the access terminal and/or increase the power levels used on the sub-bands allocated for the access terminal. In addition, neighbor access points may back-off these sub-bands.

41 Claims, 12 Drawing Sheets

(51) Int. Cl.
*H04W 72/08* (2009.01)
*H04W 16/10* (2009.01)
*H04L 5/00* (2006.01)

(52) U.S. Cl.
CPC ........... *H04L 5/0096* (2013.01); *H04W 16/10* (2013.01); *H04W 72/085* (2013.01); *H04L 5/0005* (2013.01)

(58) Field of Classification Search
CPC ..... H04W 52/38; H04W 28/16; H04W 24/02; H04W 72/048; H04W 72/04; H04W 72/0433; H04W 16/00; H04W 16/06; H04W 16/14; H04W 72/02; H04W 72/0406; H04W 72/06; H04W 72/08
USPC .......... 455/446, 447, 450–453; 370/329, 330, 370/341, 344
See application file for complete search history.

(56) References Cited

U.S. PATENT DOCUMENTS

| | | | | |
|---|---|---|---|---|
| 2008/0171516 | A1* | 7/2008 | Kakura | H04B 7/086 455/63.4 |
| 2009/0061778 | A1* | 3/2009 | Vrzic | H04W 16/02 455/62 |
| 2009/0086791 | A1* | 4/2009 | Bienas | H04B 1/7143 375/132 |
| 2009/0247148 | A1* | 10/2009 | Chen | H04W 72/1284 455/422.1 |
| 2011/0261677 | A1* | 10/2011 | Kim | H04L 5/003 370/210 |
| 2012/0008489 | A1 | 1/2012 | Higuchi et al. | |
| 2012/0028664 | A1 | 2/2012 | Zhang et al. | |
| 2012/0122503 | A1 | 5/2012 | Ma et al. | |
| 2012/0157155 | A1* | 6/2012 | Cho | H04W 52/54 455/522 |
| 2012/0207040 | A1* | 8/2012 | Comsa | H04W 72/1215 370/252 |
| 2012/0236977 | A1 | 9/2012 | Zou et al. | |
| 2012/0329464 | A1* | 12/2012 | Tanaka | H04W 72/0426 455/438 |
| 2013/0059618 | A1* | 3/2013 | Cao | H01Q 1/246 455/509 |
| 2013/0107929 | A1* | 5/2013 | Ma | H04W 72/08 375/225 |

OTHER PUBLICATIONS

International Search Report and Written Opinion—PCT/US2014/055552—ISA/EPO—Nov. 20, 2014.
Liu L., et al., "A Novel Fractional Frequency Reuse Structure Based on Interference Avoidance Scheme in Multi -cell LTE Network", Communications and Networking in China (CHINACOM), 2011 6th International ICST Conference on, IEEE, Aug. 17, 2011 (Aug. 17, 2011), pp. 551-555, XP032119967, DOI: 10.1109/CHINACOM.2011.6158215 ISBN: 978-1-4577-0100-9.

* cited by examiner

MOBILITY-BASED FRACTIONAL FREQUENCY REUSE

BACKGROUND

Field

This application relates generally to communication and more specifically, but not exclusively, to fractional frequency reuse.

Introduction

A wireless communication network may be deployed to provide various types of services (e.g., voice, data, multimedia services, etc.) to users within a geographical area. In a typical implementation, macro access points (e.g., corresponding to different macro cells) are distributed throughout a network to provide wireless connectivity for access terminals (e.g., cell phones) that are operating within the geographical area served by the network.

In some networks, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

At a given point in time, an access terminal may be served by a given one of these access points. As the access terminal roams throughout the geographical area, the access terminal may move away from its serving access point and move closer to another access point. In addition, signal conditions within a given cell may change, whereby an access terminal may be better served by another access point. In these cases, to maintain mobility for the access terminal, the access terminal may be handed-over from its serving access point to the other access point.

In practice, issues may arise relating to mobility of an access terminal, particularly in the case where the network includes regions of densely populated low-power access points. A fast moving access terminal may frequently experience poor service due to signal conditions encountered at the cell edges of these access points. For example, an access terminal may experience radio link failure (RLF) with its serving cell before the access terminal can be handed-over to a neighboring cell.

SUMMARY

A summary of several sample aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to using fractional frequency reuse (FFR) to improve communication for an access terminal that is moving, that is at a cell edge, or that is otherwise experiencing poor link quality. In particular, FFR is employed to free-up or otherwise reserve resources for the access terminal at the serving access point and/or neighbor access points. For example, the serving access point may allocate additional sub-bands for the access terminal and/or increase the power levels used on the sub-bands allocated for the access terminal. In addition, neighbor access points may back-off these sub-bands (e.g., entirely or by reducing power on the sub-bands) in an attempt to further ensure that the access terminal will experience good link quality on these sub-bands.

The disclosure relates in some aspects to triggering FFR based on a mobility condition at an access terminal. For example, upon determining that an access terminal is moving (or at a cell edge, or experiencing poor link conditions, etc.), FFR may be defined (e.g., invoked or modified) for the serving access point of the access terminal and/or for neighbor access points in an attempt to maintain acceptable link quality (e.g., to avoid RLF) for the access terminal. In some cases, the trigger condition relates to link quality at the access terminal (e.g., signal to interference-plus-noise ratio (SINR), reference signal received quality (RSRQ) in LTE, or reference signal received power (RSRP) in LTE).

FFR may be triggered by different types of apparatuses in different implementations. For example, FFR may be triggered by the access terminal, by the serving access point for the access terminal, by a neighbor access point, or by some other node (e.g., some other network entity).

In the case of access terminal-triggered FFR, upon determining that it is moving (or at a cell edge, etc.), the access terminal may transmit (e.g., broadcast) a message to invoke or modify FFR at its serving access point and/or at one or more neighbor access points. In some aspects, the message transmitted by the access terminal may specify an FFR allocation for the access terminal (e.g., to be used at the access point(s)). In this case, any access point that receives the message may define its FFR in the appropriate manner. For example, the serving access point may start using the sub-bands newly allocated for the access terminal and neighbor access points may back-off these sub-bands.

In the case of access point-triggered FFR, upon determining that the access terminal is moving (or at a cell edge, etc.), an access point may define FFR parameters for itself and, optionally, for its neighbor access points. The access point may then send a message to its neighbor access points to inform them of the FFR allocation. These neighbor cells may then invoke or modify FFR in an appropriate manner (e.g., in a manner that differs from the allocation employed by the serving access point).

In some aspects, an apparatus for communication in accordance with the teachings herein comprises: a processing system configured to determine at least one mobility condition of an access terminal, and further configured to define fractional frequency reuse for at least one access point based on the determined at least one mobility condition; and a communication device configured to send an indication of the defined fractional frequency reuse.

In some aspects, a method of communication in accordance with the teachings herein comprises: determining at least one mobility condition of an access terminal; defining fractional frequency reuse for at least one access point based on the determined at least one mobility condition; and sending an indication of the defined fractional frequency reuse.

In some aspects, an apparatus for communication in accordance with the teachings herein comprises: means for determining at least one mobility condition of an access terminal; means for defining fractional frequency reuse for at least one access point based on the determined at least one mobility condition; and means for sending an indication of the defined fractional frequency reuse.

In some aspects, a computer-program product in accordance with the teachings herein comprises computer-readable medium comprising code for causing a computer to: determine at least one mobility condition of an access terminal; define fractional frequency reuse for at least one access point based on the determined at least one mobility condition; and send an indication of the defined fractional frequency reuse.

BRIEF DESCRIPTION OF THE DRAWINGS

These and other sample aspects of the disclosure will be described in the detailed description and the claims that follow, and in the accompanying drawings, wherein:

Figure 1:
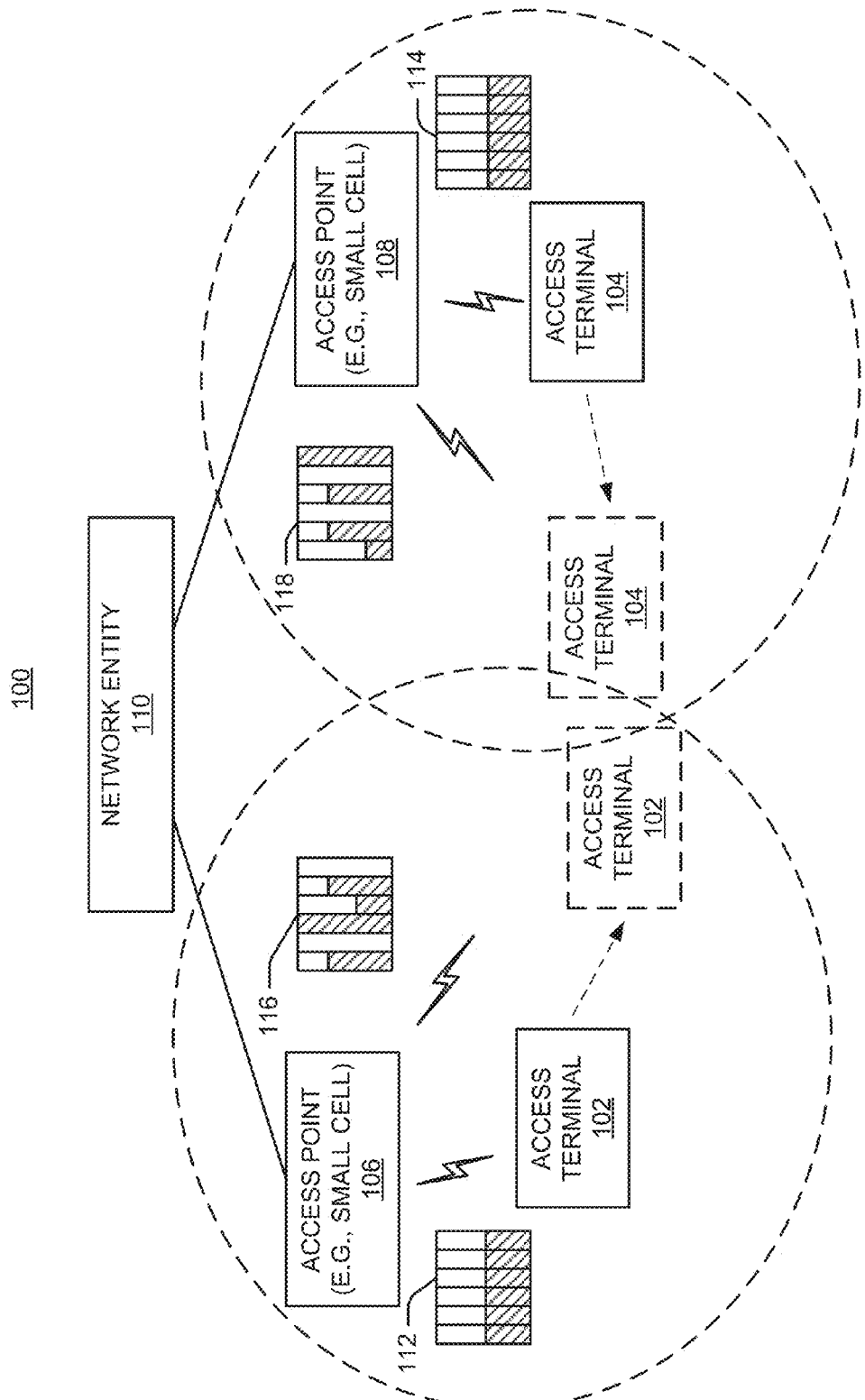
FIG. 1 is a simplified diagram of several sample aspects of a communication system that supports mobility-based FFR.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points in the system 100 provide access to one or more services (e.g., network connectivity) for one or more wireless terminals (e.g., access terminals 102 and 104) that may be installed within or that may roam throughout a coverage area of the system 100. For example, at various points in time the access terminal 102 may connect to an access point 106, an access point 108, or some other access point in the system 100 (not shown). Similarly, at various points in time the access terminal 104 may connect to the access point 108, the access point 106, or some other access point.

Each of the access points may communicate with one or more network entities (represented, for convenience, by a network entity 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entity 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

Some of the access points (e.g., the access points 106 and 108) in the system 100 may comprise low-power access points. Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells. Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

When an access terminal is located close to a small cell, all of the available channel resources (e.g., a radio frequency carrier resource) may be allocated for communication between the access terminal and the small cell. Due to the close proximity of these components, the communication is less likely to interfere with neighboring cells, and vice versa. Thus, a high level of service may be provided for the access terminal without adversely affecting service at neighbor cells.

FIG. 1 illustrates a simplified example, where a carrier resource is defined by 6 sub-bands as indicated by the columns of the symbols 112, 114, 116, and 118. The vertical axis in each column represents allocated transmission power for that sub-band. In the example shown in FIG. 1, when the access terminal 102 is near the access point 106, all six sub-bands are allocated for communication between the access terminal 102 and the access point 106 as indicated by the symbol 112. Similarly, when the access terminal 104 is near the access point 108, all six sub-bands are allocated for communication between the access terminal 104 and the access point 108 as indicated by the symbol 114.

As an access terminal moves within the coverage of a cell, the access terminal may experience deterioration in service. Such deterioration in service may occur during handover or non-handover operations.

For example, due to pilot pollution, a mobile access terminal may experience RLF whenever signals from a target cell quickly become stronger (as seen by the access terminal). In such a case, the signals from the target cell may swamp the signals from the serving cell, thereby preventing the access terminal from receiving handover or other messages from the serving cell.

As another example, as an access terminal approaches a cell edge of a home cell, the signals from a neighbor cell (as seen by the access terminal) may become stronger than the signals from the home cell. In this case, handover of the access terminal may not be desired. Thus, the quality of the communication between the access terminal and its home cell may suffer.

In accordance with the teachings herein, FFR may be employed based on access terminal mobility to improve service for mobile access terminals. In the simplified example of FIG. 1, cell coverage is represented by the dashed ovals, access terminal movement is represented by the dashed arrows, and a new location of an access terminal is shown in phantom (represented by a dashed block). As represented by the symbols 116 and 118, as the access terminal 102 moves (or nears a cell edge, etc.), FFR is defined in a manner that mitigates interference from neighbor cells and/or improves service from the serving cell. In this particular example, FFR defined for the cell of access point 106 specifies that transmission power for communication between the access terminal 102 (shown in phantom) and the access point 106 is increased in the first, third, and fifth sub-bands of symbol 116, while transmission power for this communication is decreased in the second, fourth, and sixth sub-bands of symbol 116. In a complementary manner, FFR defined for the cell of access point 108 specifies that transmission power (e.g., for communication between the access terminal 104 (shown in phantom) and the access point 108) is increased in the second, fourth, and sixth sub-bands of symbol 118, while transmission power for this communication is decreased in the first, third, and fifth sub-bands of symbol 118. Thus, mobility-based FFR may be defined such that a neighbor cell backs-off the sub-band(s) used by a mobile access terminal under certain conditions.

Sample operations relating to FFR as taught herein will now be described in more detail in conjunction with the flowchart of FIG. 2. For convenience, the operations of FIG. 2 (or any other operations discussed or taught herein) may be described as being performed by specific components (e.g., components of FIG. 1, FIG. 3, FIG. 5, FIG. 7. etc.). It should be appreciated, however, that these operations may be performed by other types of components and may be performed using a different number of components. It also should be appreciated that one or more of the operations described herein may not be employed in a given implementation.

Figure 2:
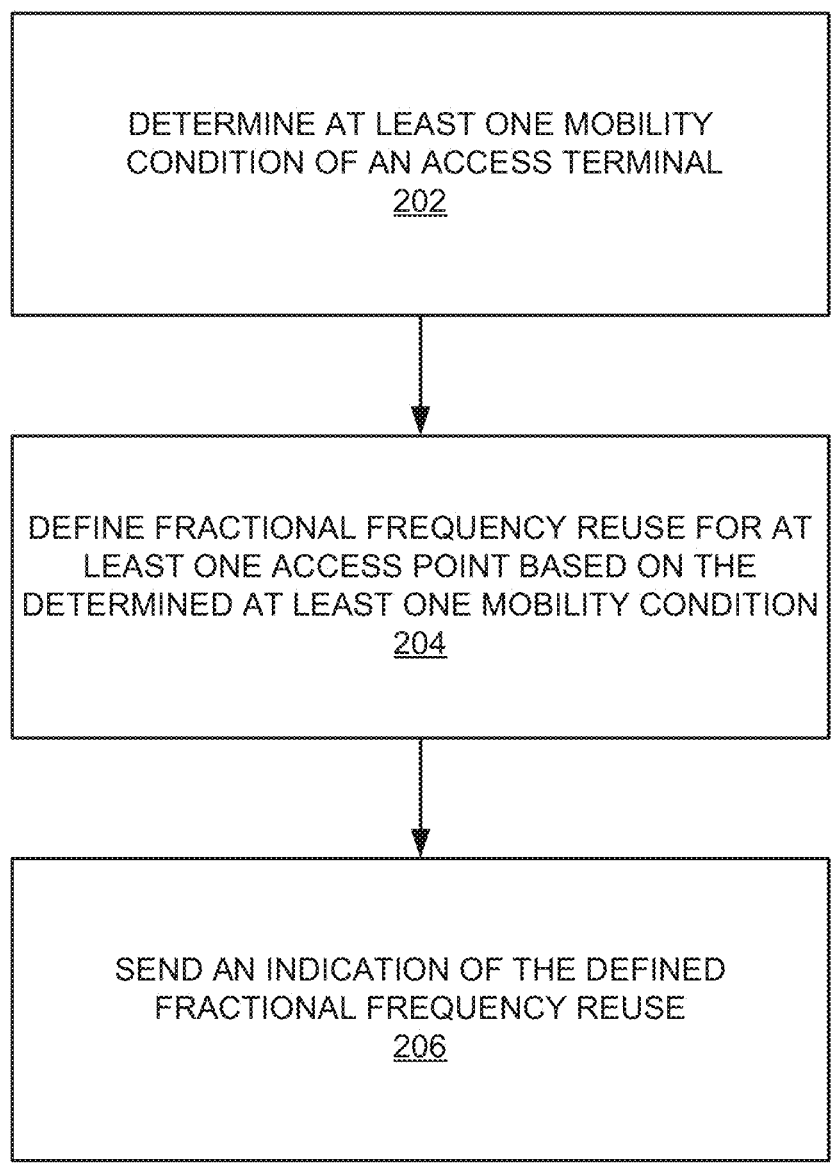
FIG. 2 is a flowchart of several sample aspects of operations that may be performed in conjunction with providing mobility-based FFR.

As represented by block 202 of FIG. 2, at least one mobility condition of an access terminal is determined Different mobility conditions may be used to trigger FFR in different implementations and/or use scenarios. For example, a mobility condition may relate to one or more of: whether an access terminal is at a cell edge, the manner (e.g., velocity, direction, acceleration, etc.) of access terminal movement, signal conditions (e.g., link quality) at an access terminal, or handover history of an access terminal.

As represented by block 204, FFR for at least one access terminal is defined based on the mobility condition(s) determined at block 202. For example, FFR may be defined for the serving access point (e.g., cell) for the access terminal and, optionally, for one or more neighbor access points. The decision regarding which access points are to employ FFR may depend, for example, on whether a modification of the resource allocation for a given access point will improve signal conditions at the access terminal. In general, FFR is defined for those resources on which the access terminal will be scheduled. That is, resources that are not used to provide service for the access terminal need not be taken into consideration for the FFR allocation.

Hard FFR or soft FFR may be employed in a given scenario. For example, for hard FFR, a home cell may employ full power on a first subset of the available sub-bands and not transmit on the remaining sub-bands (a second subset of the sub-bands), while a neighbor cell employs full power on the second subset of sub-bands and does not transmit on the first subset of sub-bands. In contrast, for soft FFR, different cells may transmit on the same sub-bands, but do so at reduced power. The symbols 116 and 118 in FIG. 1 (particularly, the first and fourth sub-bands) illustrate an example of soft FFR.

Defining FFR may involve, in some aspects, defining which resources are to be used by a given cell (e.g., frequency sub-band partitioning), defining the transmit power to be used on a given resource, or both. For example, defining FFR to reduce interference at an access terminal may involve boosting transmit power on the resource(s) allocated to a cell for transmitting to the access terminal and/or reducing transmit power of neighboring cells on the resource(s). As another example, defining FFR to reduce interference at an access terminal may involve allocating at least one resource for a cell to transmit to the access terminal and/de-allocating at least one resource for neighboring cells. Thus, in some aspect, defining FFR in accordance with the teachings herein may involve resource management triggered by mobility and/or power management triggered by mobility.

FFR may be defined for access terminals independently or on a group basis. As an example of the former case, an access point may independently define FFR parameters for each of its served access terminal. In this case, different FFR parameters may be used for different access terminals. As an example of the latter case, an access point may define one set of FFR parameters that is used when communicating with any of a set of served access terminals.

FFR may be defined in different ways in different implementations and/or use scenarios. For example, the definition of FFR may involve invoking FFR in cases where FFR was not previously in use. Conversely, the definition of FFR may involve modifying (e.g., adapting) FFR in cases where FFR was previously in use. Also, FFR may be disabled in some cases (e.g., when the access terminal moves back toward the cell site).

Mobility-based FFR may be static or dynamic. As an example of the former case, the FFR parameters used under certain defined mobility conditions may be predefined. For example, a specific set of FFR parameters may be used whenever an access terminal is at a cell edge. As an example of the latter case, the FFR parameters used at a given point in time may be selected based on current conditions for the access terminal. For example, less aggressive FFR may be defined for an access terminal experiencing low interference at a cell edge as compared to an access terminal experiencing high interference at the cell edge.

Thus, in some aspects, FFR as taught herein may be used to allocate resources for cells that have mobile access terminals (e.g., high mobility users). Moreover, the FFR may be defined in a deterministic manner, where deterministic resources are allocated to the mobile access terminals.

As represented by block 206 of FIG. 2, an apparatus that defines the FFR at block 204 may send (e.g., transmit) an indication of the defined fractional reuse to one or more apparatuses. For example, such an indication may be sent to one or more of the access points for which the FFR is defined. In some aspects, the sending of the indication comprises the access terminal transmitting a fractional frequency reuse parameter to at least one access point. In some aspects, the sending of the indication comprises a serving access point sending a fractional frequency reuse parameter to at least one other access point.

As discussed in more detail below, the operations of FIG. 2 may be implemented by different types of apparatuses (e.g., nodes) in different implementations.

In some implementations, these operations are performed, at least in part, by an access point. For example, a cell (e.g., a serving cell) may monitor the mobility of an access terminal, define FFR associated with the access terminal as appropriate (e.g., when the access terminal is moving at a high rate of speed), and send requests to neighbor cells to employ the defined FFR. An example of an access point-centric implementation is described below in conjunction with FIGS. 3 and 4.

In some implementations, the operations of FIG. 2 are performed, at least in part, by the access terminal. For example, an access terminal may monitor its mobility, define FFR as appropriate, and send requests to the access terminal's serving cell and neighbor cells to employ the defined FFR. An example of an access terminal-centric implementation is described below in conjunction with FIGS. 5 and 6.

In some implementations, the operations of FIG. 2 are performed, at least in part, by a network entity. For example, a network management component (e.g., a Home NodeB gateway) may collect information regarding the mobility of any access terminals within a specified domain (e.g., by receiving reports from access points within the domain). The network entity may thus define FFR for the access points within that domain, as warranted by the mobility of the access terminal(s), and send the FFR parameters to the access points.

Figure 3:
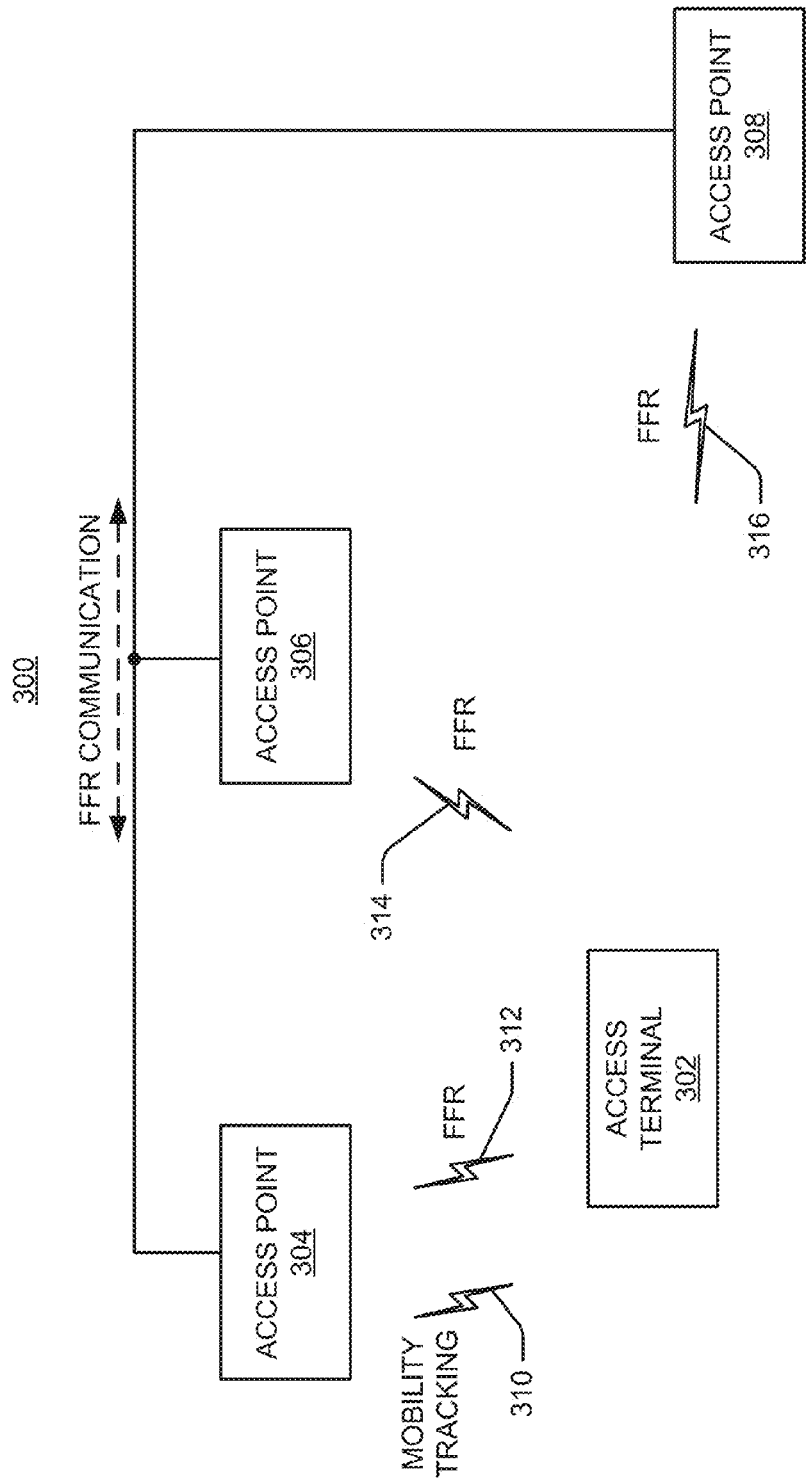
FIG. 3 is a simplified diagram of several sample aspects of a communication system where an access point tracks mobility of an access terminal and defines FFR accordingly.

Referring to FIG. 3, in this example, an access point 304 tracks the mobility of an access terminal 302 to determine whether to trigger FFR for the access terminal 302. For example, the access point 304 may use signaling (e.g., radio frequency signaling) as represented by the symbol 310 to receive mobility-related information from the access terminal 302 or to otherwise track the access terminal (e.g., via Doppler signaling). In a typical scenario, the access point 304 would be the serving access point for the access terminal 302. However, access terminal mobility tracking may be employed at non-serving access points in some scenarios.

Upon determining that FFR is warranted, the access point 304 communicates with one or more neighbor access points (e.g., the access points 306 and 308) to configure the use of FFR in the vicinity of the access terminal 302. In a typical implementation, the access points 304-308 communicate via a backhaul. In addition, neighbor access points may be identified through the use of a neighbor list maintained at or for each access point.

Once the access points 304-308 are configured, transmissions by each of the access points will be limited based on designated FFR parameters. As indicated by the symbols 312, 314, and 316, different FFR parameters will typically be used by the access points 304, 306, and 308, respectively.

Figure 4:
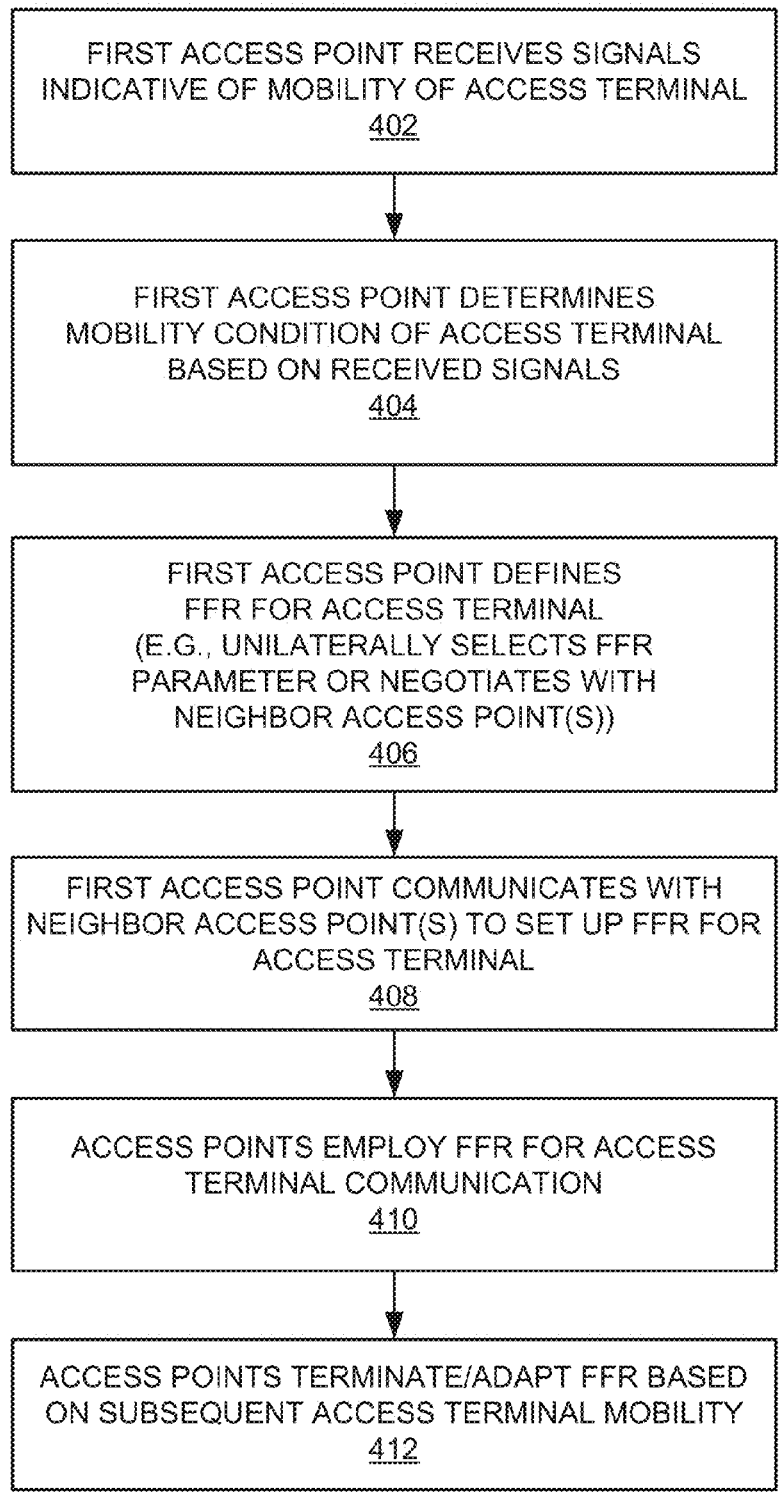
FIG. 4 is a flowchart of several sample aspects of operations that may be performed in conjunction with an access point defining FFR based on mobility of an access terminal.

FIG. 4 illustrates an example of operations that may be employed in an implementation where FFR is defined by an access point based on mobility of an access terminal.

As represented by block 402, a first access point receives signals indicative of mobility of an access terminal. For example, the first access point may employ a Doppler-based tracking device, whereby the first access point monitors Doppler signals from the access terminal (e.g., signals generated by the access terminal or signals bouncing off the access terminal). As another example, the first access point may receive measurement reports, handover messages, or other signals transmitted by the access terminal that may be used to determine the location, motion, or other mobility conditions of the access terminal.

As represented by block 404, the first access point determines a mobility condition of the access terminal based on the received signals. In some aspects, the determination of the at least one mobility condition comprises determining whether the access terminal is moving. In some aspects, the determination of the at least one mobility condition comprises determining whether the access terminal is near a cell edge. In some aspects, the determination of the at least one mobility condition comprises determining quality of a link associated with the access terminal. In some aspects, the determination of the at least one mobility condition comprises determining a velocity of the access terminal. In some aspects, the determination of the at least one mobility condition comprises determining a direction of movement of the access terminal. In some aspects, the determination of the at least one mobility condition comprises determining a frequency of handover of the access terminal. In some aspects, the determination of the at least one mobility condition comprises determining whether the access terminal is "ping-ponging" between at least two access points.

As represented by block 406, the first access point defines FFR for the access terminal (e.g., defines the FFR to be used for communicating with the access terminal). In some aspects, the definition of the fractional frequency reuse comprises invoking or modifying fractional frequency reuse for at least one access point if the access terminal is moving in a manner that meets or exceeds a movement threshold. In some aspects, the definition of the fractional frequency reuse comprises identifying fractional frequency reuse that will result in reduced interference at the access terminal. In some aspects, the definition of the fractional frequency reuse comprises invoking or modifying fractional frequency reuse for at least one access point if a distance of the access terminal to the cell edge is at or within (e.g., less than or equal to) a distance threshold. In some aspects, the definition of the fractional frequency reuse comprises invoking or modifying fractional frequency reuse for at least one access point if the signal strength of a signal from the at least one access point, as measured by the access terminal, is at or within (e.g., less than or equal to) a signal strength threshold. For example, fractional frequency reuse may be invoked or modified if a received signal strength indicator (RSSI) of a signal from an access point, as measured by an access terminal, is less than an RSSI threshold. In some aspects, the definition of the fractional frequency reuse comprises invoking or modifying fractional frequency reuse for at least one access point if the quality of the link is less than or equal to a quality threshold. Link quality may be determined, for example, via channel quality indicator (CQI) feedback from an access terminal or radio resource management (RRM) measurements such as serving cell measurements or neighbor cell measurements. The definition of fractional frequency reuse may be based on one or more of the above factors (or any other appropriate factors).

In some cases, the first access point unilaterally selects the FFR parameters (e.g., the sub-bands to be used and/or the transmission power to be used on each sub-band) to be used by itself and any neighbor access point that will be configured for FFR as a result of the mobility of the access terminal. Alternatively, in other cases, the access points negotiate to select the FFR parameter(s) to be used by each access point. This scenario may be employed, for example, in cases where each access point may need to cooperate with more than one other access point to define FFR for mobile access terminals in different cells.

In general, the FFR parameters may be based on characteristics associated with access points that are near (e.g., "seen by") the access terminal (e.g., access points whose broadcast signals are successfully received by the access terminal). For example, fewer sub-bands and/or lower transmission power may be allocated for access points that are closer to the access terminal or that have stronger signals at the access terminal. In this way, interference by the strongest interferers may be reduced, while affecting the operation of weak interferers as little as possible.

As represented by block 408, in either of the scenarios of block 406, the first access point may communicate with one or more neighbor access points to set up FFR for the access terminal Specifically, in the unilateral scenario, the first access point sends a message to each neighbor access point informing the access point of the FFR parameters that it should use. Conversely, in the negotiation scenario, the access points send messages to one another in conjunction with agreeing on the different FFR parameters to be used by the different access points.

As represented by block 410, each access point employs the designated FFR for communication with its respective access terminals. In this way, mobile access terminals in each cell may receive better service as compared to deployments that do not use mobility-based FFR as taught herein.

As represented by block 412, at some point in time, the access points may terminate or otherwise adapt the FFR set up at blocks 402-410 as a result of subsequent mobility of the access terminal. For example, the access terminal may move near the cell site. In such a case, resources may be allocated as they were previously. As another example, the access terminal may move out of the coverage of these cells. In this case, the resources may be allocated to other access terminals, if applicable.

As mentioned above, an access point may define FFR for its served access terminals on an individual access terminal basis or on an access terminal group basis. In the former case, an access point may perform operations similar to those described above at blocks 402-412 independently for each of its access terminals. In the latter case, the operations described above at blocks 402-412 are used to provide FFR for all of the access terminals of the group.

Figure 5:
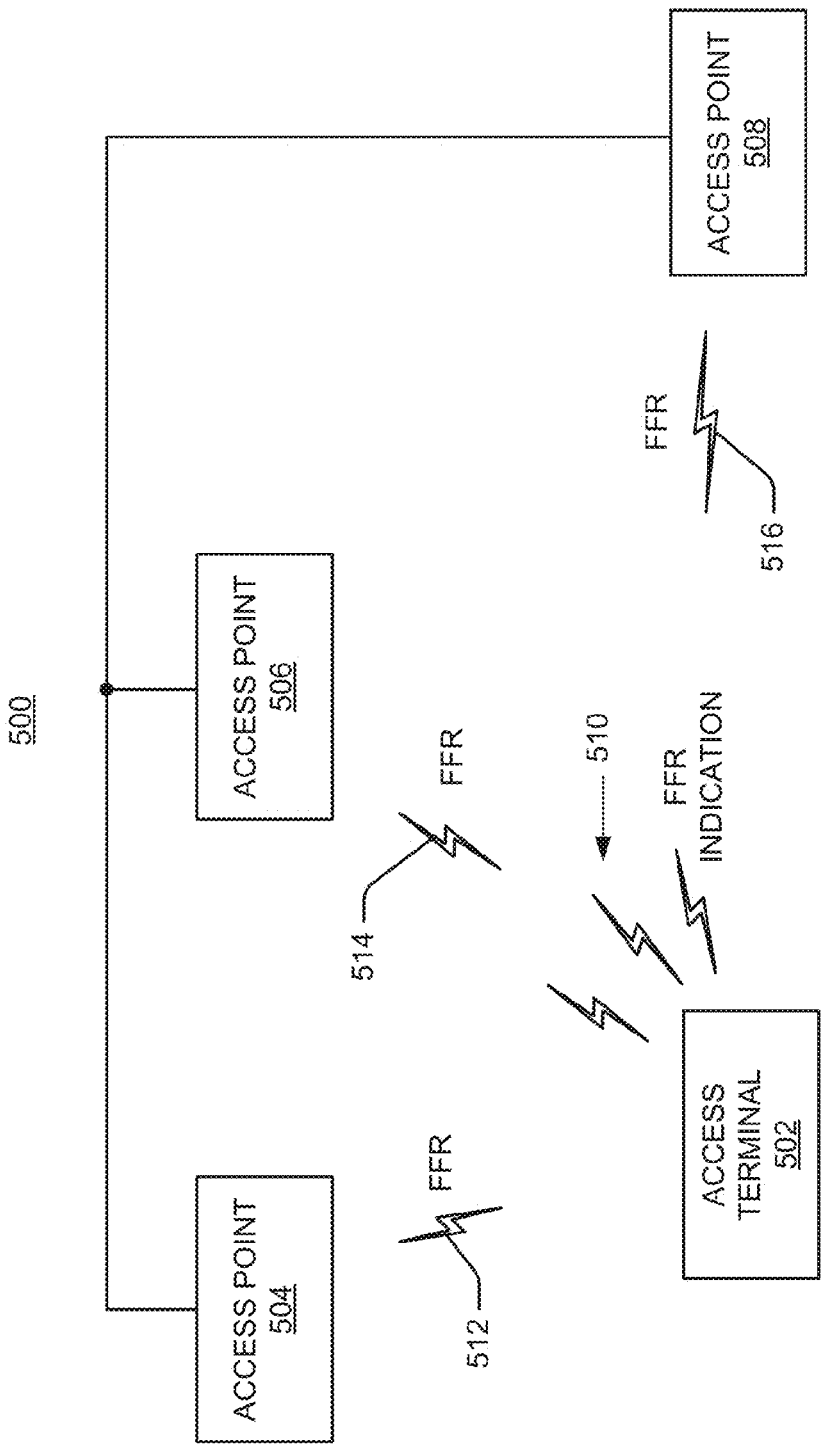
FIG. 5 is a simplified diagram of several sample aspects of a communication system where an access terminal tracks its mobility and defines FFR accordingly.

Referring to FIG. 5, in this example, an access terminal 502 tracks its own mobility to determine whether to trigger FFR. For example, the access terminal 502 may employ sensors (e.g., accelerometers) to track its motion. As another example, the access terminal 502 may determines its location (and, by extension, its movement) based on signals received from known access points (e.g., using trilateralization or triangulation). Also, the access terminal 502 may collect handover statistics or statistics relating to link conditions.

Upon determining that FFR is warranted, the access terminal 502 communicates with one or more nearby access points (e.g., the access points 504, 506, and 508) to configure these access points for appropriate FFR. In the example of FIG. 5, this communication is represented by the FFR indication 510.

In some implementations, the access terminal 502 transmits an over-the-air (OTA) message including the designated FFR parameters to its serving access point (e.g., the access point 504). The serving access point will then communication (e.g., via a backhaul) with its neighbor access points (e.g., the access points 506 and 508) to configure all of the access points in the vicinity of the access terminal 502 with the appropriate FFR information. Here, neighbor access points may be identified through the use of a neighbor list maintained at or for each access point.

In other implementations, the access terminal 502 broadcasts an over-the-air (OTA) message including the designated FFR parameters. In this case, each access point that successfully receives the message may configure itself to use the designated FFR parameters.

Once the access points 504-508 are configured, transmissions by each of the access points will be limited based on designated FFR parameters. As indicated by the symbols 512, 514, and 516, different FFR parameters will typically be used by the access points 504, 506, and 508, respectively.

Figure 6:
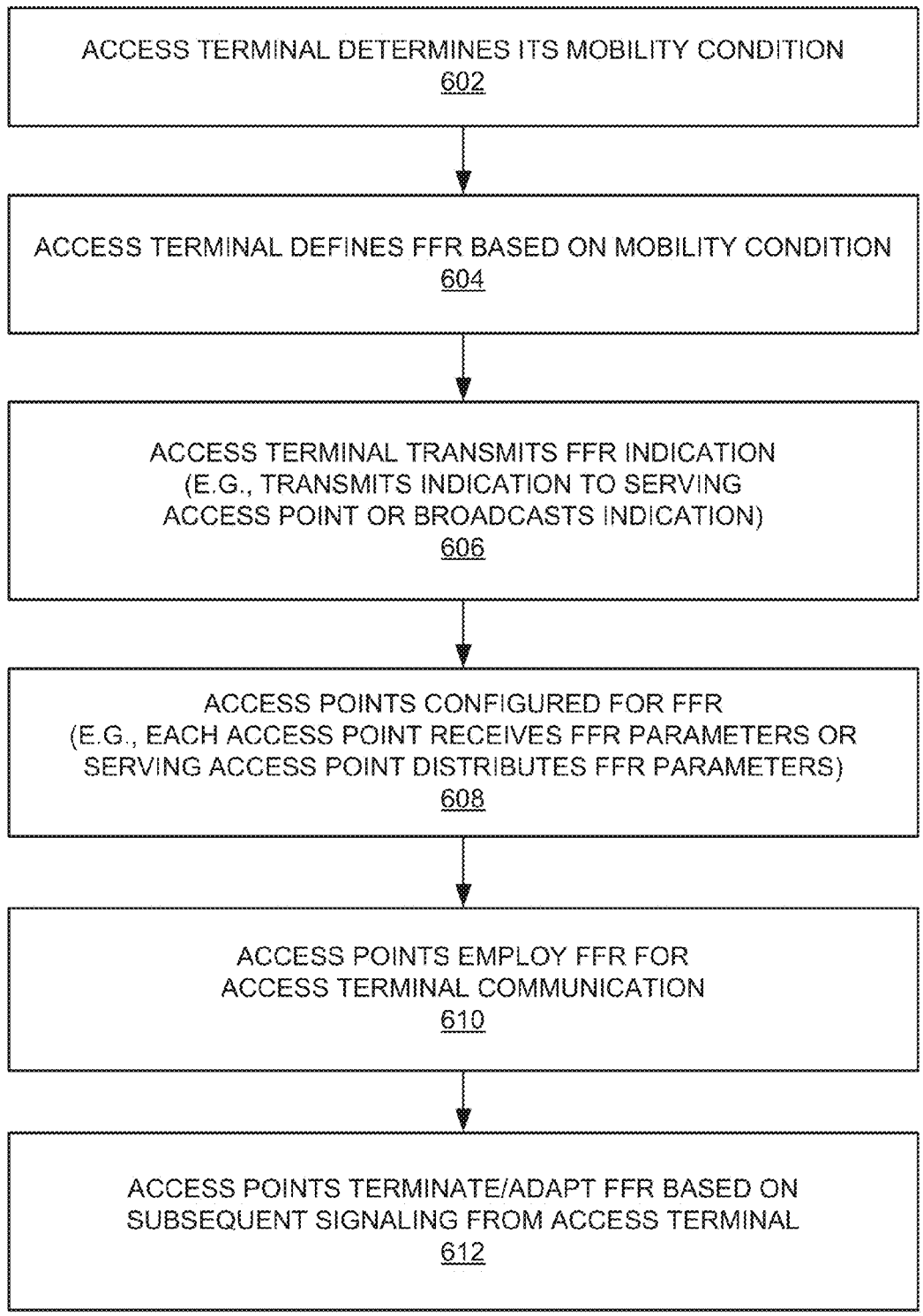
FIG. 6 is a flowchart of several sample aspects of operations that may be performed in conjunction with an access terminal defining FFR based on its mobility.

FIG. 6 illustrates an example of operations that may be employed in an implementation where FFR is defined by a mobile access terminal.

As represented by block 602, the access terminal determines its mobility condition. In some aspects, the determination of at least one mobility condition comprises determining whether the access terminal is moving. In some aspects, the determination of at least one mobility condition comprises determining whether the access terminal is near a cell edge. In some aspects, the determination of at least one mobility condition comprises determining quality of a link associated with the access terminal. In some aspects, the determination of at least one mobility condition comprises determining a velocity of the access terminal. In some aspects, the determination of at least one mobility condition comprises determining a direction of movement of the access terminal. In some aspects, the determination of at least one mobility condition comprises determining a frequency of handover of the access terminal. In some aspects, the determination of at least one mobility condition comprises determining whether the access terminal is pingponging between at least two access points.

As represented by block 604, the access terminal defines FFR based on the mobility condition determined at block 602. In some aspects, the definition of the fractional frequency reuse comprises invoking or modifying fractional frequency reuse for at least one access point if the access terminal is moving in a manner that meets or exceeds a movement threshold. In some aspects, the definition of the fractional frequency reuse comprises identifying fractional frequency reuse that will result in reduced interference at the access terminal. In some aspects, the definition of the fractional frequency reuse comprises invoking or modifying fractional frequency reuse for at least one access point if a distance of the access terminal to the cell edge is at or within (e.g., less than or equal to) a distance threshold. In some aspects, the definition of the fractional frequency reuse comprises invoking or modifying fractional frequency reuse for at least one access point if the signal strength of a signal from the at least one access point, as measured by the access terminal, is at or within (e.g., less than or equal to) a signal strength threshold. In some aspects, the definition of the fractional frequency reuse comprises invoking or modifying fractional frequency reuse for at least one access point if the quality of the link is less than or equal to a quality threshold. Again, the definition of fractional frequency reuse may be based on one or more of the above factors (or any other appropriate factors).

In general, the access terminal may define FFR parameters based on characteristics associated with nearby access points that are "seen by" the access terminal (e.g., access points whose broadcast signals are successfully received by the access terminal). For example, the access terminal may allocate fewer sub-bands and/or lower transmission power for access points that are closer to the access terminal or that have stronger signals at the access terminal. In this way, the access terminal may reduce interference by the strongest interferers, while affecting the operation of weak interferers as little as possible.

As represented by block 606, the access terminal transmits an FFR indication to one or more nearby access points to set up FFR for the access terminal. As discussed above, in some cases, the access terminal transmits a message to its serving access point where the message indicates the FFR parameters that nearby access points should use. Alternatively, the access terminal may broadcast a message that informs nearby access points of the FFR parameters that they should use.

As represented by block 608, upon receipt of the message from the access terminal or a neighbor access point, each access point is configured to use the designated FFR. As discussed herein, a given access point may receive its FFR parameters directly from the access terminal, via another access point, or via some other node (e.g., a network entity).

As represented by block 610, each access point employs the designated FFR for communication with its respective access terminals. In this way, mobile access terminals in each cell may receive better service as compared to deployments that do not use mobility-based FFR as taught herein.

As represented by block 612, at some point in time, the access points may terminate or otherwise adapt the FFR set up at blocks 602-610 as a result of subsequent mobility of the access terminal. For example, the access terminal may move near the cell site. In such a case, resources may be allocated as they were previously. As another example, the access terminal may move out of the coverage of these cells. In this case, the resources may be allocated to other access terminals, if applicable.

Figure 7:
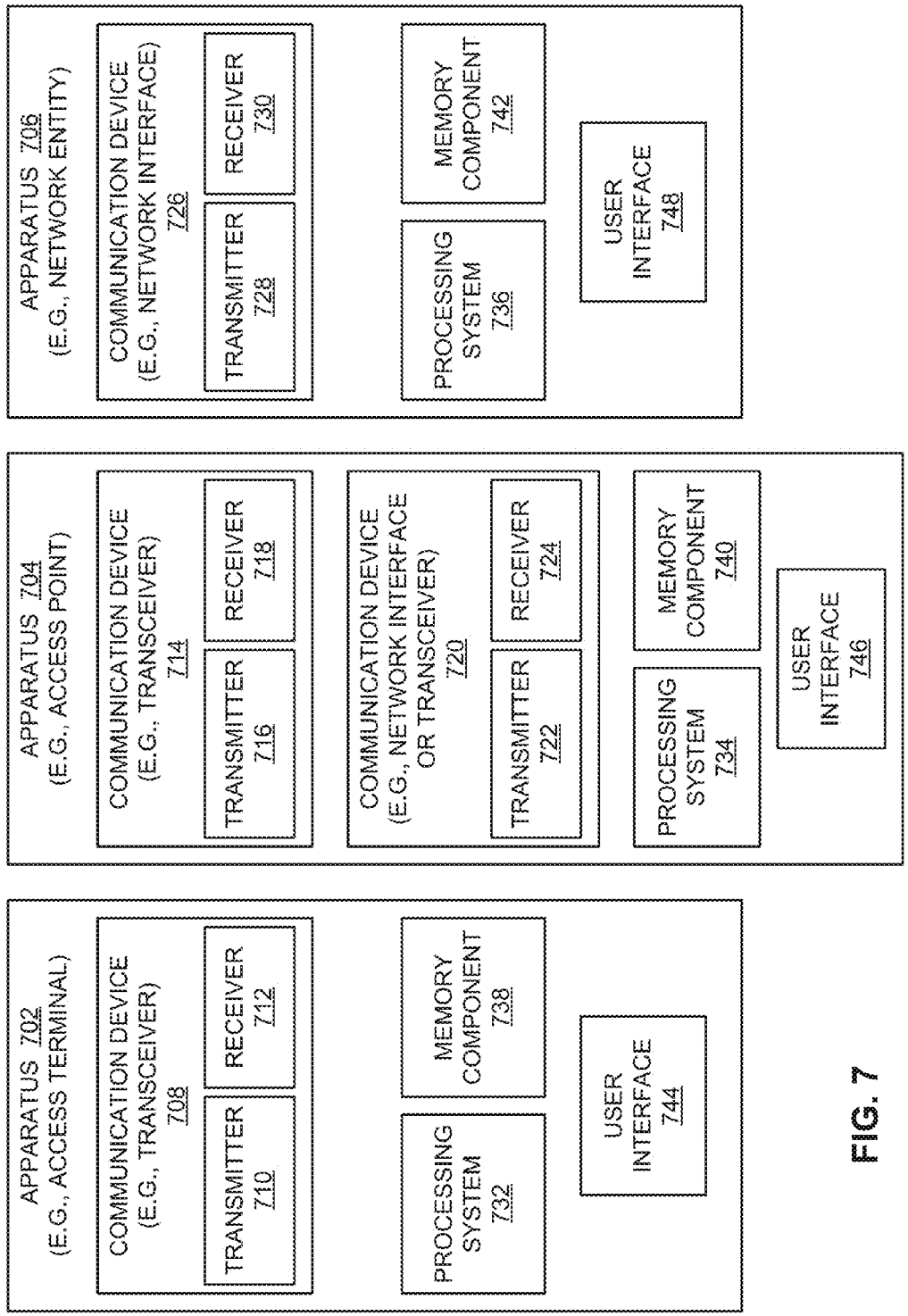
FIG. 7 is a simplified block diagram of several sample aspects of components that may be employed in communication nodes.

FIG. 7 illustrates several sample components (represented by corresponding blocks) that may be incorporated into an apparatus 702, an apparatus 704, and an apparatus 706 (e.g., corresponding to an access terminal, an access point, and a network entity, respectively) to perform FFR-related operations as taught herein. It should be appreciated that these components may be implemented in different types of apparatuses in different implementations (e.g., in an ASIC, in a system on a chip (SoC), etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 702 and the apparatus 704 each include at least one wireless communication device (represented by the communication devices 708 and 714 (and the communication device 720 if the apparatus 704 is a relay access point)) for communicating with other nodes via at least one designated radio access technology. Each communication device 708 includes at least one transmitter (represented by the transmitter 710) for transmitting and encoding signals (e.g., messages, indications, information, and so on) and at least one receiver (represented by the receiver 712) for receiving and decoding signals (e.g., messages, indications, information, pilots, and so on). Similarly, each communication device 714 includes at least one transmitter (represented by the transmitter 716) for transmitting signals (e.g., messages, indications, information, pilots, and so on) and at least one receiver (represented by the receiver 718) for receiving signals (e.g., messages, indications, information, and so on). If the apparatus 704 is a relay access point, each communication device 720 may include at least one transmitter (represented by the transmitter 722) for transmitting signals (e.g., messages, indications, information, pilots, and so on) and at least one receiver (represented by the receiver 724) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 704 comprises a network listen module.

The apparatus 706 (and the apparatus 704 if it is not a relay access point) includes at least one communication device (represented by the communication device 726 and, optionally, 720) for communicating with other nodes. For example, the communication device 726 may comprise a network interface that is configured to communicate with one or more network entities via a wire-based or wireless backhaul. In some aspects, the communication device 726 may be implemented as a transceiver configured to support wire-based or wireless signal communication. This communication may involve, for example, sending and receiving: messages, parameters, or other types of information. Accordingly, in the example of FIG. 7, the communication device 726 is shown as comprising a transmitter 728 and a receiver 730. Similarly, if the apparatus 704 is not a relay access point, the communication device 720 may comprise a network interface that is configured to communicate with one or more network entities via a wire-based or wireless backhaul. As with the communication device 726, the communication device 720 is shown as comprising a transmitter 722 and a receiver 724.

The apparatuses 702, 704, and 706 also include other components that may be used in conjunction with communication operations as taught herein. The apparatus 702 includes a processing system 732 for providing functionality relating to, for example, monitoring access terminal mobility and defining FFR as taught herein and for providing other processing functionality. The apparatus 704 includes a processing system 734 for providing functionality relating to, for example, monitoring access terminal mobility and defining FFR as taught herein and for providing other processing functionality. The apparatus 706 includes a processing system 736 for providing functionality relating to, for example, monitoring access terminal mobility and defining FFR as taught herein and for providing other processing functionality. The apparatuses 702, 704, and 706 include memory components 738, 740, and 742 (e.g., each including a memory device), respectively, for maintaining information (e.g., thresholds, parameters, FFR information, and so on). In addition, the apparatuses 702, 704, and 706 include user interface devices 744, 746, and 748, respectively, for providing indications (e.g., audible and/or visual indications) to a user and/or for receiving user input (e.g., upon user actuation of a sensing device such a keypad, a touch screen, a microphone, and so on).

For convenience, the apparatus 702 is shown in FIG. 7 as including components that may be used in the various examples described herein. In practice, the illustrated blocks may have different functionality in different scenarios. For example, functionality of the block 734 for supporting the implementation of FIG. 4 may be different as compared to functionality of the block 732 for supporting the implementation of FIG. 6.

The components of FIG. 7 may be implemented in various ways. In some implementations, the components of FIG. 7 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 708, 732, 738, and 744 may be implemented by processor and memory component(s) of the apparatus 702 (e.g., by execution of appropriate code and/or by appropriate configuration of processor components). Similarly, some or all of the functionality represented by blocks 714, 720, 734, 740, and 746 may be implemented by processor and memory component(s) of the apparatus 704 (e.g., by execution of appropriate code and/or by appropriate configuration of processor components). Also, some or all of the functionality represented by blocks 726, 736, 742, and 748 may be implemented by processor and memory component(s) of the apparatus 706 (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area.

In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 8:
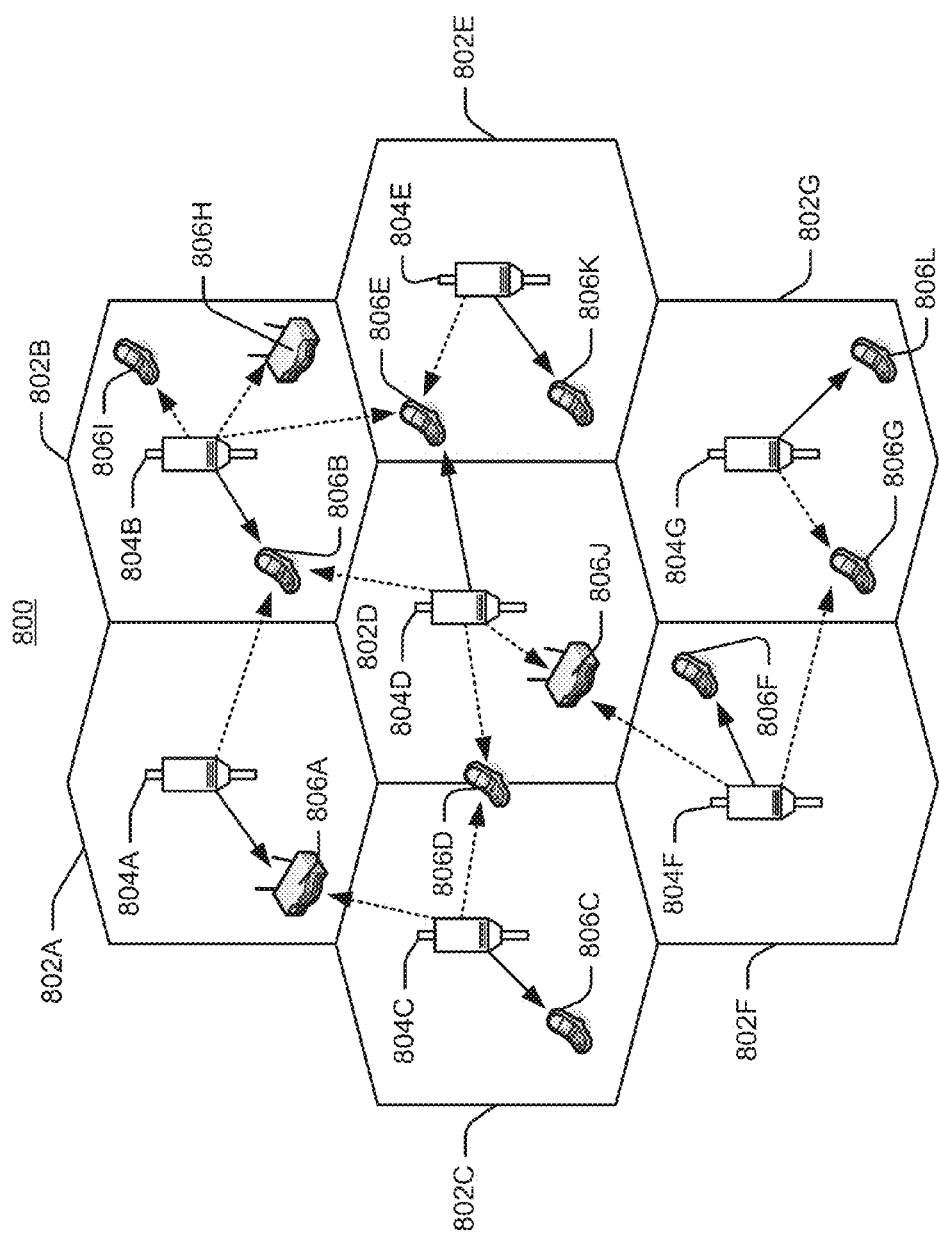
FIG. 8 is a simplified diagram of a wireless communication system.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G). As shown in FIG. 8, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in a rural environment.

Figure 9:
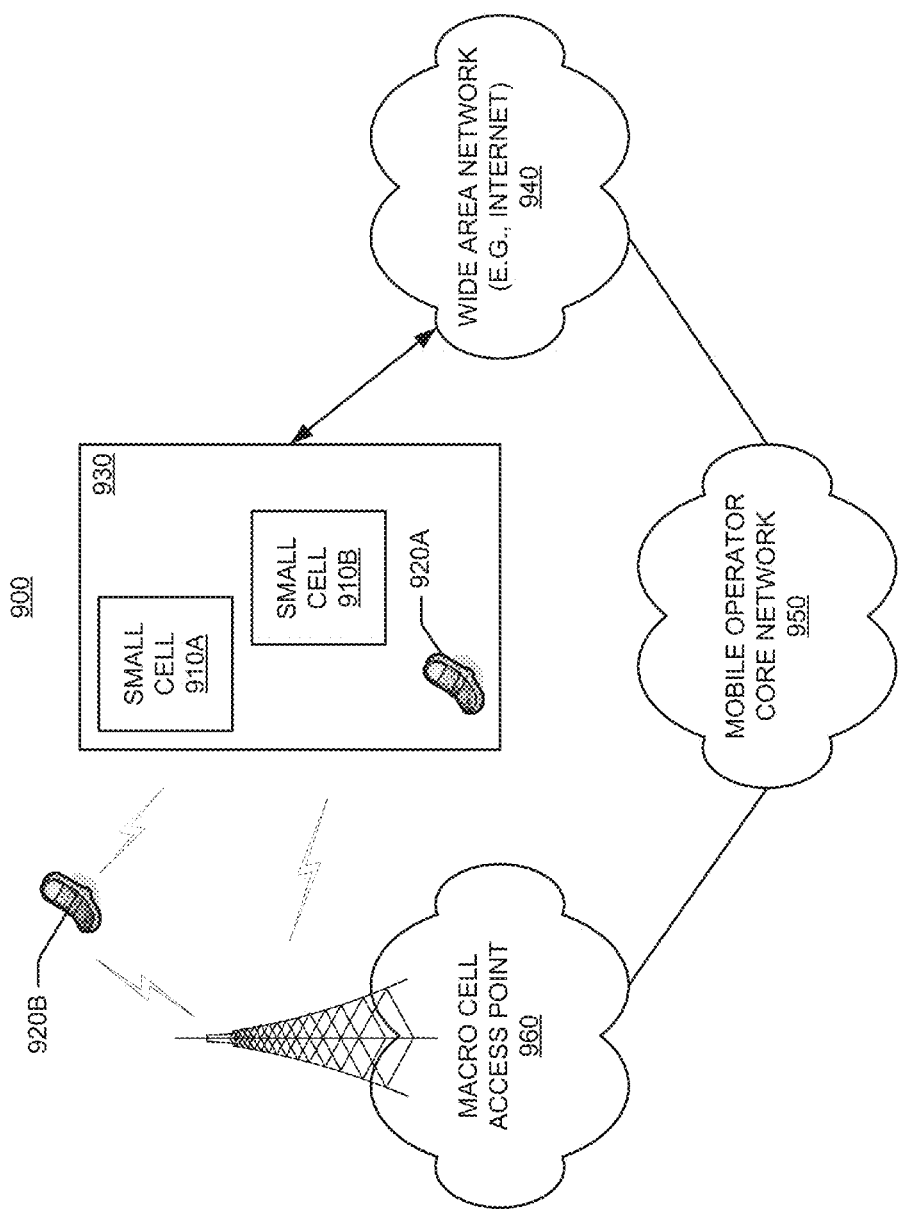
FIG. 9 is a simplified diagram of a wireless communication system including small cells.

FIG. 9 illustrates an exemplary communication system 900 where one or more small cells are deployed within a network environment. Specifically, the system 900 includes multiple small cells 910 (e.g., small cells 910A and 910B) installed in a relatively small scale network environment (e.g., in one or more user residences 930). Each small cell 910 may be coupled to a wide area network 940 (e.g., the Internet) and a mobile operator core network 950 via a DSL router, a cable modem, a wireless link, or other connectivity means (not shown). As will be discussed below, each small cell 910 may be configured to serve associated access terminals 920 (e.g., access terminal 920A) and, optionally, other (e.g., hybrid or alien) access terminals 920 (e.g., access terminal 920B). In other words, access to small cells 910 may be restricted whereby a given access terminal 920 may be served by a set of designated (e.g., home) small cell(s) 910 but may not be served by any non-designated small cells 910 (e.g., a neighbor's small cell 910).

Figure 10:
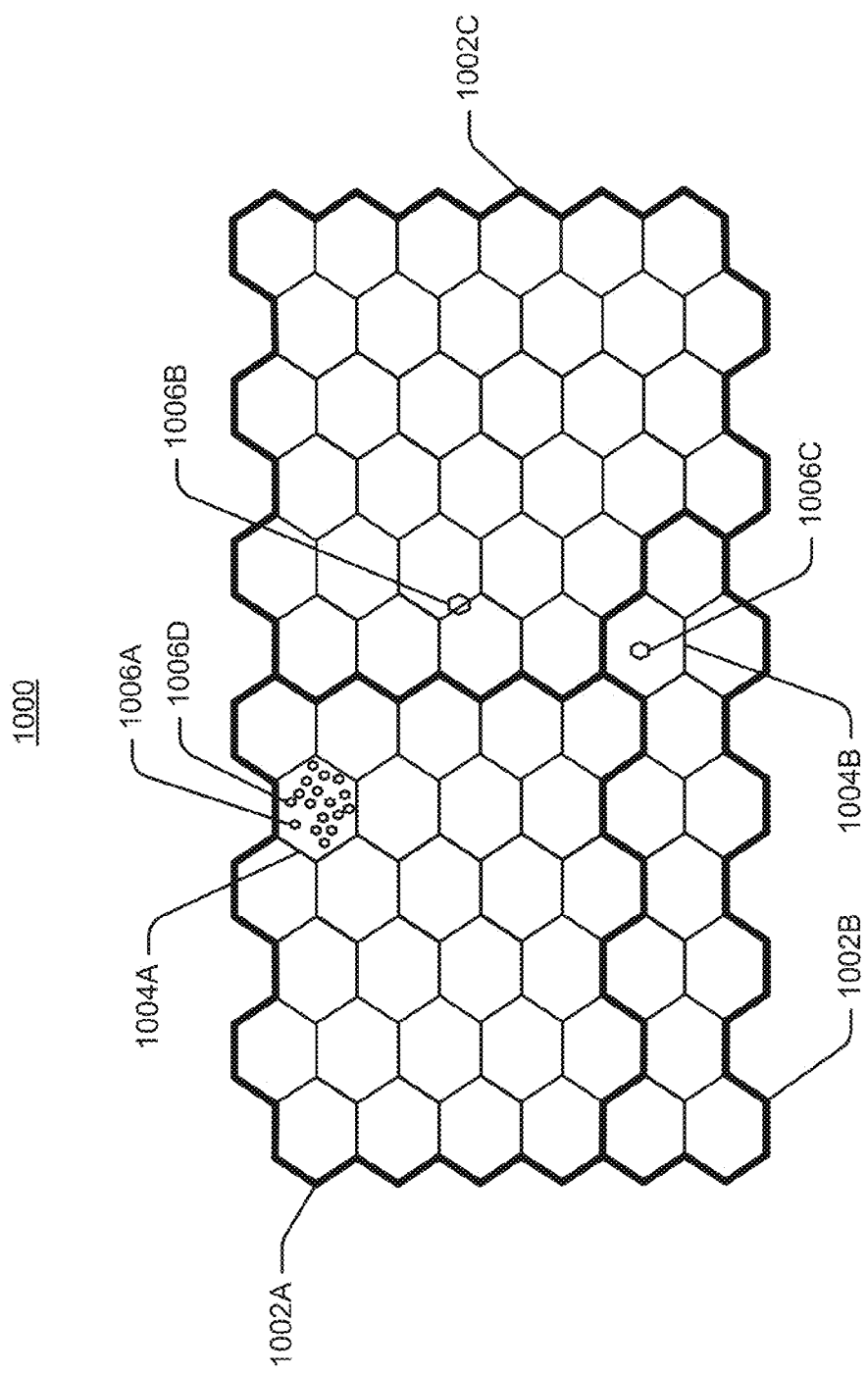
FIG. 10 is a simplified diagram illustrating coverage areas for wireless communication.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include femto coverage areas 1006. In this example, each of the femto coverage areas 1006 (e.g., femto coverage areas 1006B and 1006C) is depicted within one or more macro coverage areas 1004 (e.g., macro coverage areas 1004A and 1004B). It should be appreciated, however, that some or all of a femto coverage area 1006 might not lie within a macro coverage area 1004. In practice, a large number of femto coverage areas 1006 (e.g., femto coverage areas 1006A and 1006D) may be defined within a given tracking area 1002 or macro coverage area 1004. Also, one or more pico coverage areas (not shown) may be defined within a given tracking area 1002 or macro coverage area 1004.

Referring again to FIG. 9, the owner of a small cell 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of small cells 910 (e.g., the small cells 910A and 910B that reside within a corresponding user residence 930). For example, when a subscriber is outside his home, he is served by a standard macro access point (e.g., access point 960) and when the subscriber is at home, he is served by a small cell (e.g., small cell 910A). Here, a small cell 910 may be backward compatible with legacy access terminals 920.

A small cell 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred small cell (e.g., the home small cell of the access terminal 920) whenever such connectivity is possible. For example, whenever the access terminal 920A is within the user's residence 930, it may be desired that the access terminal 920A communicate only with the home small cell 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred small cell 910) using a better system reselection (BSR) procedure, which may involve a periodic scanning of available systems to determine whether better systems are currently available and subsequently acquire such preferred systems. The access terminal 920 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 910, the access terminal 920 selects the small cell 910 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 910 that reside within the corresponding user residence 930). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., 911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
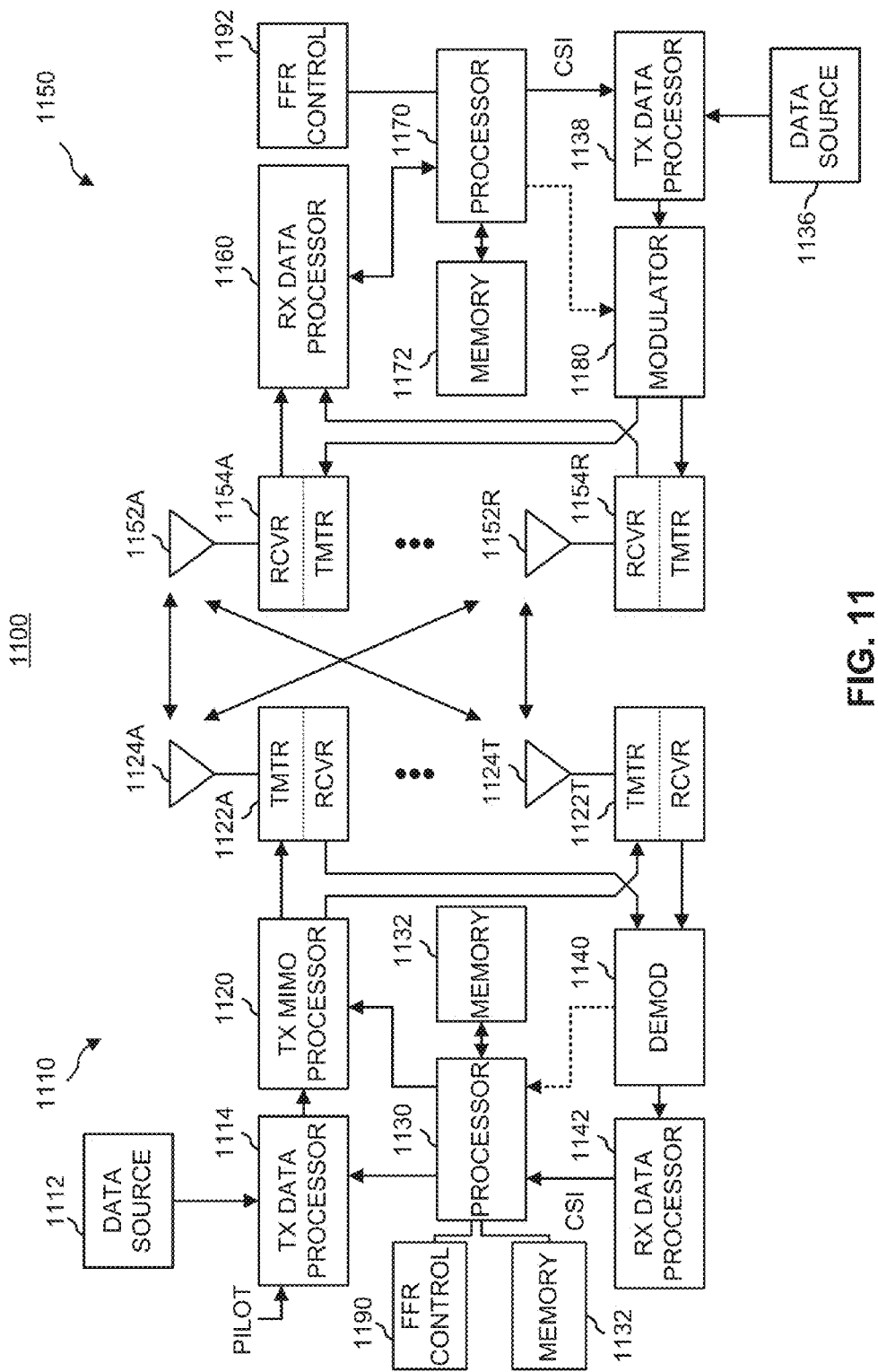
FIG. 11 is a simplified block diagram of several sample aspects of communication components.

FIG. 11 illustrates a wireless device 1110 (e.g., an access point) and a wireless device 1150 (e.g., an access terminal) of a sample MIMO system 1100. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which precoding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform FFR-related control operations as taught herein. For example, an FFR control component 1190 may cooperate with the processor 1130 and/or other components of the device 1110 to send/receive signals to/from another device (e.g., device 1150) as taught herein. Similarly, an FFR control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the FFR control component 1190 and the processor 1130 and a single processing component may provide the functionality of the FFR control component 1192 and the processor 1170.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims.

Figure 12:
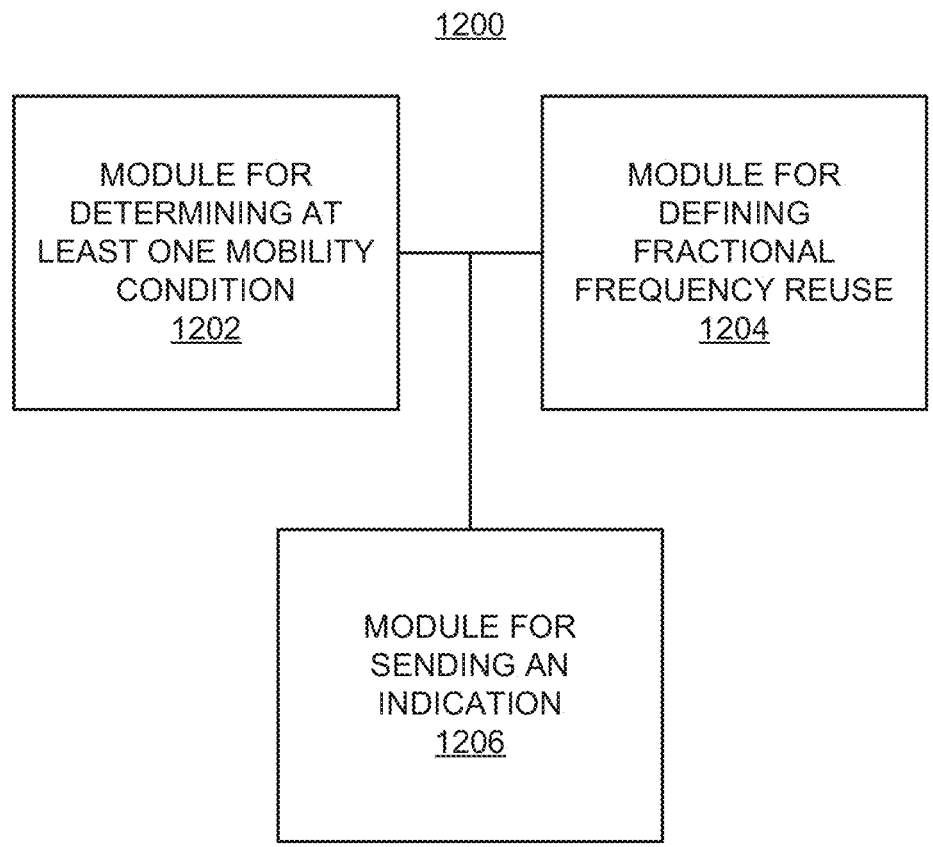
FIG. 12 is a simplified block diagram of several sample aspects of an apparatus configured to support FFR as taught herein.

Referring to FIG. 12, an apparatus 1200 is represented as a series of interrelated functional modules. A module for determining at least one mobility condition 1202 may correspond at least in some aspects to, for example, a processing system as discussed herein. A module for defining fractional frequency reuse 1204 may correspond at least in some aspects to, for example, a processing system as discussed herein. A module for sending an indication 1206 may correspond at least in some aspects to, for example, a communication device as discussed herein.

The functionality of the modules of FIG. 12 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. As one specific example, the apparatus 1200 may comprise a single device (e.g., components 1202-1206 comprising different sections of an ASIC). As another specific example, the apparatus 1200 may comprise several devices (e.g., the components 1202 and 1204 comprising one ASIC and the component 1206 comprising another ASIC). The functionality of these modules also may be implemented in some other manner as taught herein. In some aspects one or more of any dashed blocks in FIG. 12 are optional.

In addition, the components and functions represented by FIG. 12 as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein.

Several examples follow. In some aspects, means for determining comprises a processing system, means for defining comprises a processing system, and means for sending comprises a communication device.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code(s) executable (e.g., executable by at least one computer) to provide functionality relating to one or more of the aspects of the disclosure. In some aspects a computer program product may comprise packaging materials.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory (i.e., tangible) computer-readable medium (e.g., computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for communication, comprising:
a processing system configured to determine a mobility condition of an access terminal, and further configured to define fractional frequency reuse for at least one access point based on the mobility condition, wherein, to define the fractional frequency reuse, the processing system is configured to:
in response to a determination that the mobility condition of the access terminal does not exceed a movement threshold, allocate to the access terminal a first transmission power associated with a first sub-band and a second transmission power associated with a second sub-band; and
in response to a determination that the mobility condition of the access terminal exceeds the movement threshold, allocate to the access terminal a higher transmission power associated with the first sub-band, wherein the higher transmission power is greater than the first transmission power; and
a communication device configured to send an indication of the defined fractional frequency reuse.

2. The apparatus of claim 1, wherein the definition of the fractional frequency reuse comprises identifying fractional frequency reuse that will result in reduced interference at the access terminal.

3. The apparatus of claim 1, wherein to determine the mobility condition, the processing system is further configured to determine whether the access terminal is near a cell edge.

4. The apparatus of claim 3, wherein the processing system is further configured to determine whether a distance of the access terminal to the cell edge is at or within a distance threshold.

5. The apparatus of claim 1, wherein the processing system is further configured to determine the mobility condition based on a signal strength of a signal from the at least one access point, as measured by the access terminal.

6. The apparatus of claim 1, wherein the processing system is further configured to determine the mobility condition based on a quality of a link associated with the access terminal.

7. The apparatus of claim 6, wherein the definition of the fractional frequency reuse comprises invoking or modifying fractional frequency reuse for the at least one access point if the quality of the link is less than or equal to a quality threshold.

8. The apparatus of claim 1, wherein:
the processing system is further configured to determine at least one other mobility condition of another access terminal, and further configured to define other fractional frequency reuse for the at least one access point based on the determined at least one other mobility condition; and
the communication device is further configured to send another indication of the defined other fractional frequency reuse.

9. The apparatus of claim 1, wherein to determine the mobility condition, the processing system is further configured to determine a velocity of the access terminal.

10. The apparatus of claim 1, wherein to determine the mobility condition, the processing system is further configured to determine a direction of movement of the access terminal.

11. The apparatus of claim 1, wherein to determine the mobility condition, the processing system is further configured to determine a frequency of handover of the access terminal.

12. The apparatus of claim 1, wherein the processing system is further configured to determine the mobility condition based on whether the access terminal is ping-ponging between at least two of the plurality of access points.

13. The apparatus of claim 1, wherein the apparatus comprises a serving access point for the access terminal and the communication device is further configured to send the indication to at least one other access point, wherein the indication is configured to cause the other access point to:
based on a mobility condition of another access terminal, allocate to the access terminal a higher transmission power associated with the second sub-band, wherein the higher transmission power is greater than the second transmission power.

14. The apparatus of claim 1, wherein the apparatus comprises a serving access point for the access terminal and the defining further comprises negotiating between the serving access point and the at least one other access point to select fractional frequency reuse parameters for the serving access point and the at least one other access point.

15. The apparatus of claim 1, wherein, to define the fractional frequency reuse, the processing system is further configured to:
in further response to the determination that the mobility condition of the access terminal exceeds the movement threshold, allocate to the access terminal a lower transmission power associated with the second sub-band, wherein the lower transmission power is less than the second transmission power.

16. A method of communication, comprising:
determining a mobility condition of an access terminal;
defining fractional frequency reuse for at least one access point based on the mobility condition, the defining comprising:
in response to a determination that the mobility condition of the access terminal does not exceed a movement threshold, allocating to the access terminal a first transmission power associated with a first sub-band and a second transmission power associated with a second sub-band; and
in response to a determination that the mobility condition of the access terminal exceeds the movement threshold, allocating to the access terminal a higher transmission power associated with the first sub-band, wherein the higher transmission power is greater than the first transmission power; and
sending an indication of the defined fractional frequency reuse.

17. The method of claim 16, wherein the defining comprises identifying fractional frequency reuse that will result in reduced interference at the access terminal.

18. The method of claim 16, wherein determining the mobility condition further comprises determining whether the access terminal is near a cell edge.

19. The method of claim 18, wherein determining the mobility condition further comprises determining whether a distance of the access terminal to the cell edge is at or within a distance threshold.

20. The method of claim 16, wherein determining the mobility condition further comprises determining the mobility condition based on a signal strength of a signal from the access point, as measured by the access terminal.

21. The method of claim 16, wherein determining the mobility condition further comprises determining the mobility condition based on a quality of a link associated with the access terminal.

22. The method of claim 21, wherein the defining further comprises invoking or modifying fractional frequency reuse for the at least one access point if the quality of the link is less than or equal to a quality threshold.

23. The method of claim 16, further comprising:
determining at least one other mobility condition of another access terminal;
defining other fractional frequency reuse for the at least one access point based on the determined at least one other mobility condition; and
sending another indication of the defined other fractional frequency reuse.

24. The method of claim 16, wherein determining the mobility condition further comprises determining the mobility condition based on a velocity of the access terminal.

25. The method of claim 16, wherein determining the mobility condition further comprises determining the mobility condition based on a direction of movement of the access terminal.

26. The method of claim 16, wherein determining the mobility condition further comprises determining the mobility condition based on a frequency of handover of the access terminal.

27. The method of claim 16, wherein determining the mobility condition further comprises determining the mobility condition based on whether the access terminal is ping-ponging between at least two of the plurality of access points.

28. The method of claim 16, wherein the method is performed by a serving access point for the access terminal and the sending of the indication comprises sending the indication to at least one other access point, wherein the indication is configured to cause the other access point to:
based on a mobility condition of another access terminal, allocate to the access terminal a higher transmission power associated with the second sub-band, wherein the higher transmission power is greater than the second transmission power.

29. The method of claim 16, wherein the method is performed by a serving access point for the access terminal and the defining further comprises negotiating between the serving access point and the at least one other access point to select fractional frequency reuse parameters for the serving access point and the at least one other access point.

30. An apparatus for communication, comprising:
means for determining a mobility condition of an access terminal;
means for defining fractional frequency reuse for at least one access point based on the mobility condition, means for defining comprising:
means for allocating to the access terminal a first transmission power associated with a first sub-band and a second transmission power associated with a second sub-band in response to a determination that the mobility condition of the access terminal does not exceed a movement threshold; and
means for allocating to the access terminal a higher transmission power associated with the first sub-band, wherein the higher transmission power is greater than the first transmission power in response to a determination that the mobility condition of the access terminal exceeds the movement threshold;
means for sending an indication of the defined fractional frequency reuse.

31. The apparatus of claim 30, wherein means for defining comprises means for identifying fractional frequency reuse that will result in reduced interference at the access terminal.

32. The apparatus of claim 30, wherein means for determining the mobility condition further comprises means for determining whether the access terminal is near a cell edge.

33. The apparatus of claim 32, wherein means for determining whether the access terminal is near a cell edge comprises means for determining whether a distance of the access terminal to the cell edge is at or within a distance threshold.

34. The apparatus of claim 30, wherein means for determining the mobility condition further comprises means for determining the mobility condition based on a quality of a link associated with the access terminal.

35. The apparatus of claim 34, wherein means for defining further comprises means for invoking or modifying fractional frequency reuse for the at least one access point if the quality of the link is less than or equal to a quality threshold.

36. A computer-program product, comprising a non-transitory computer-readable medium comprising code for causing a computer to:
determine a mobility condition of an access terminal;
define fractional frequency reuse for at least one access point based on the mobility condition, the defining comprising:
in response to a determination that the mobility condition of the access terminal does not exceed a movement threshold, allocate to the access terminal a first transmission power associated with a first sub-band and a second transmission power associated with a second sub-band; and
in response to a determination that the mobility condition of the access terminal exceeds the movement threshold, allocate to the access terminal a higher transmission power associated with the first sub-band, wherein the higher transmission power is greater than the first transmission power; and
send an indication of the defined fractional frequency reuse.

37. The computer-program product of claim 36, wherein the defining comprises identifying fractional frequency reuse that will result in reduced interference at the access terminal.

38. The computer-program product of claim 36, wherein determining the mobility condition further comprises determining whether the access terminal is near a cell edge.

39. The computer-program product of claim 38, wherein determining the mobility condition further comprises determining whether a distance of the access terminal to the cell edge is at or within a distance threshold.

40. The computer-program product of claim 36, wherein determining the mobility condition further comprises determining the mobility condition based on a quality of a link associated with the access terminal.

41. The computer-program product of claim 40, wherein the defining further comprises invoking or modifying fractional frequency reuse for the at least one access point if the quality of the link is less than or equal to a quality threshold.

* * * * *